United States Patent [19]

Saito

[11] Patent Number: 4,482,104
[45] Date of Patent: Nov. 13, 1984

[54] TAPE CASSETTE

[75] Inventor: Kenzo Saito, Izumi, Japan

[73] Assignee: Sony Corporation, Tokyo, Japan

[21] Appl. No.: 373,127

[22] Filed: Apr. 29, 1982

[30] Foreign Application Priority Data

May 6, 1981 [JP] Japan .................................. 56-66827

[51] Int. Cl.³ ........................ G11B 15/32; G11B 23/04
[52] U.S. Cl. .................................... 242/198; 242/199; 360/132
[58] Field of Search ............... 242/197, 198, 199, 200, 242/107.4 D, 75.4; 360/132

[56] References Cited

U.S. PATENT DOCUMENTS

| 3,174,704 | 3/1965 | Replogle ...................... 242/107.4 D |
| 3,836,096 | 9/1974 | Fukushima et al. ................ 242/197 |
| 3,862,726 | 1/1975 | Ulrich et al. ............. 242/107.4 D X |
| 3,974,983 | 8/1976 | Brown et al. .................... 242/197 X |
| 4,214,719 | 7/1980 | Kato ..................................... 242/198 |

Primary Examiner—Stuart S. Levy
Assistant Examiner—Scott J. Haugland
Attorney, Agent, or Firm—Lewis H. Eslinger; Alvin Sinderbrand

[57] ABSTRACT

A tape cassette includes a housing; a supply reel rotatably mounted in the housing for supplying tape and having a lower flange section with teeth around the periphery thereof; a take-up reel rotatably mounted in the housing for taking up the tape; a pivot pin mounted in the housing between the supply and take-up reels; and a control member including a ring portion pivotally mounted on the pivot pin, a receiving plate secured to the ring portion and having a frictional contact surface in elastically forced contact with the underside of the lower flange section of the supply reel, and a lock member secured to the receiving plate, such that rotation of the supply reel in the rewind direction frictionally rotates the receiving plate about the pivot pin to pivot the lock member into engagement with the teeth to prevent rotation of the supply reel in the rewind direction and rotation of the supply reel in the forward playback direction frictionally rotates the receiving plate about the pivot pin to pivot the lock member out of engagement with the teeth to permit rotation of the supply reel in the forward playback direction.

6 Claims, 15 Drawing Figures

FIG.9
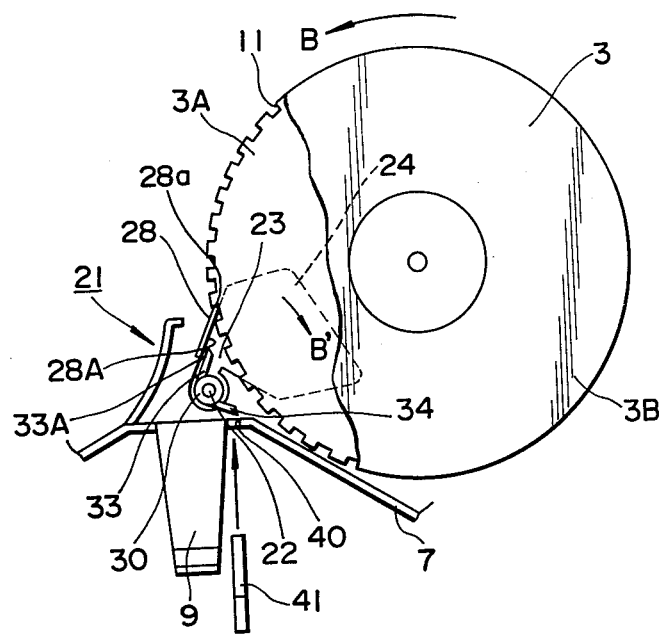
FIG.10
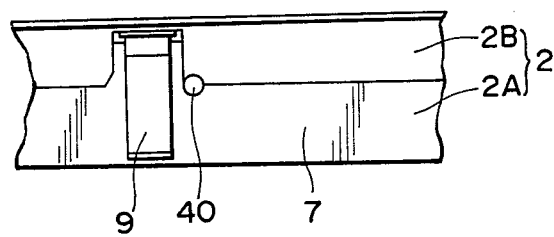
FIG.11A
FIG.11B
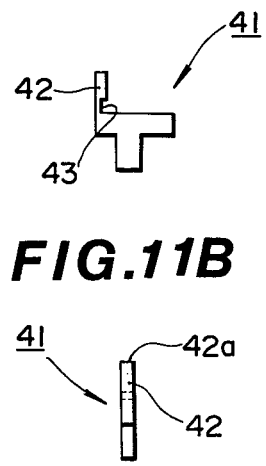

TAPE CASSETTE

BACKGROUND OF THE INVENTION

1. Field of the Invention

This invention relates generally to tape cassettes and, more particularly, is directed to a uni-directional tape cassette.

2. Description of the Prior Art

Various types of tape recording and reproducing apparatus are well known in the art, particularly those of the video tape recorder (VTR) type. With VTRs, it is possible to record, for example, motion pictures, golf lessons and the like, from a home television receiver. However, because desired material may not be shown on a home television receiver, and because the cost of purchasing video tape cassettes can be expensive, it has recently become possible to lease pre-recorded video tape cassettes which the user can play back on a home television receiver.

Generally, video tape cassettes are adapted to be played, rewound and then played again. However, with leased video tape cassettes, it is desirable to provide for only a single viewing with the tape cassette. In other words, in such case, it is desirable to prevent rewinding of the tape for repeated playback to prevent early deterioration of the tape.

With one video tape cassette, it has been proposed to prevent movement of the supply reel in the reverse direction by biasing a rotatable element into contact with a flange section of the supply reel. Generally, the flange section of the supply reel includes a number of recesses or teeth around the outer periphery of the reel. When the supply reel is rotated in the reverse or rewind direction, the rotatable element is urged strongly into contact with the flange section of the reel by a spring to prevent further movement thereof. During normal forward or playback operation when the supply reel is rotated in the opposite direction, the rotatable element does not prevent rotation thereof. However, in such case, the rotatable element repeatedly hits against the teeth of the supply reel, thereby generating undesirable mechanical noise.

OBJECTS AND SUMMARY OF THE INVENTION

Accordingly, it is an object of this invention to provide a tape cassette that avoids the above-described difficulties encountered with the prior art.

More particularly, it is an object of this invention to provide a tape cassette which prevents rewinding of the magnetic tape therein by a user.

It is another object of this invention to provide a tape cassette in which the supply reel thereof is permitted to rotate only in the forward or playback operation thereof.

It is still another object of this invention to provide a tape cassette which does not generate undesirable mechanical noise during normal forward or playback operation thereof.

In accordance with an aspect of this invention, a tape cassette includes a rotatable supply reel for supplying tape and having flange means; a rotatable take-up reel for taking up the tape; lock means for preventing rotation of the supply reel in a first direction to take up the tape; and means for moving the lock means into locking contact with the flange means to prevent rotation of the supply reel in the first direction to take up the tape and out of contact with the flange means to permit rotation of the supply reel in a second direction opposite to the first direction to supply the tape, in response to rotation of the supply reel.

The above, and other, objects, features and advantages of the present invention will be apparent from the following detailed description of an illustrative embodiment of the invention which is to be read in connnection with the accompanying drawings.

BRIEF DESCRIPTION OF THE DRAWINGS

FIG. 9 is an enlarged plan view of the reel lock mechanism of FIG. 3 during reverse or rewind rotation of the supply reel;

FIG. 10 is an enlarged elevational view of a portion of the tape cassette housing of this invention, illustrating a lock release aperture therein;

FIG. 11A is an enlarged plan view of a reel lock release tool for releasing the reel lock mechanism of FIG. 3 to rewind the tape onto the supply reel; and FIG. 11B is an enlarged end view of the reel lock release tool of FIG. 11A.

DETAILED DESCRIPTION OF A PREFERRED EMBODIMENT

Figure 1:
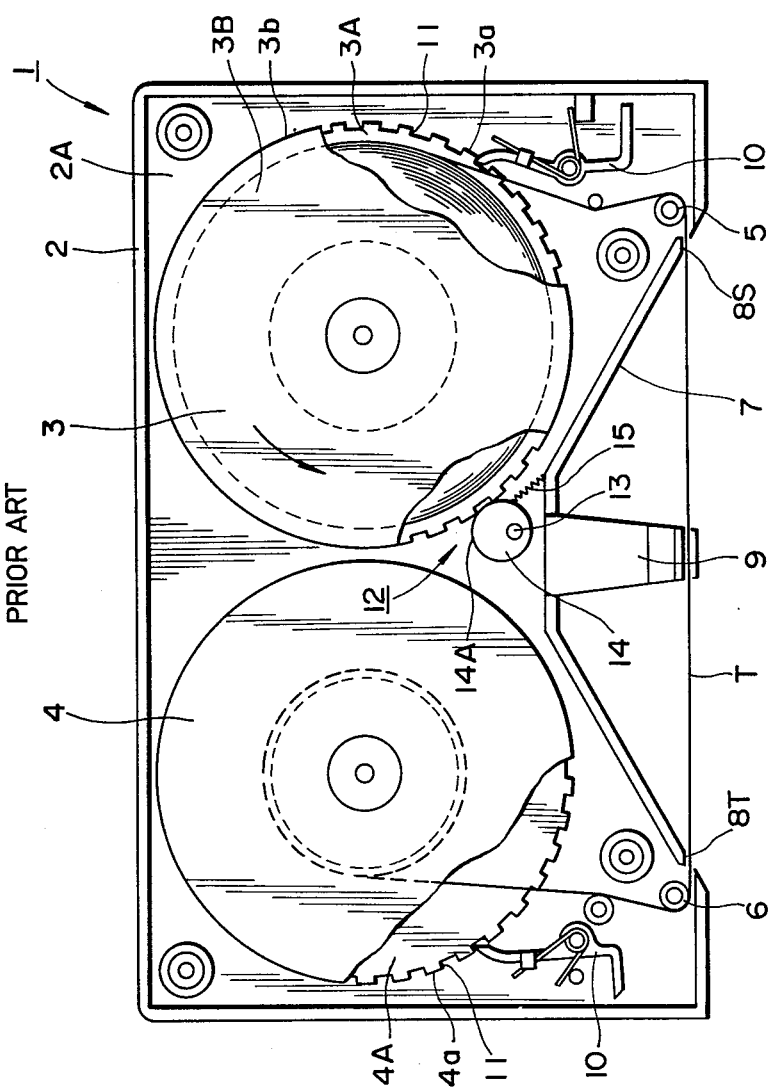
FIG. 1 is a schematic plan view, partially broken away, of a tape cassette according to the prior art with the upper half thereof removed.

Referring to the drawings in detail, and initially to FIG. 1 thereof, a tape cassette, for example, a video tape cassette for a video tape recorder (VTR), according to the prior art is shown which permits movement of the magnetic tape therein only in the forward or playback direction and prevents movement of the magnetic tape in the rewind direction. In particular, a supply reel 3 and take-up reel 4 are rotatably positioned within the lower half 2A of a cassette housing 2 of a tape cassette 1, cassette housing 2 including a front wall 7 formed in a substantially inverted V-shaped configuration. A magnetic tape T is wound about supply reel 3 and take-up reel 4 and extends therebetween and, in particular, magnetic tape T extends from supply reel 3, around a supply side guide roller 5, through a first opening 8S in front wall 7 adjacent guide roller 5, through a second opening 8T in the opposite take-up side of front wall 7, around a take-up side guide roller 6 and onto take-up reel 4. An L-shaped tape position regulating element 9 is also provided and extends from the center of the V-shaped configuration of front wall 7 about tape T to prevent sagging or looseness of the latter extending between openings 8S and 8T.

Supply reel 3 and take-up reel 4 each have respective lower reel flange sections 3A and 4A, respectively, which are formed along their peripheries 3a and 4a, respectively, with a plurality of recesses or teeth 11. Reel lock members 10 are provided on the supply and take-up sides and are adapted to engage with teeth 11 of the reels to prevent rotation of the latter when tape cassette 1 is not in use. In this manner, sagging of the tape is prevented when tape cassette 1 is not in use. In particular, when tape cassette 1 is loaded into, for example, a VTR, a front cover (not shown) provided on front wall 7 of tape cassette 1 is opened, which results in the reel lock members 10 being disengaged from teeth 11 of supply reel 3 and take-up reel 4. On the other hand, when tape cassette 1 is removed from the VTR, the front cover is closed, whereby reel lock members 10 are engaged with teeth 11 to prevent rotation of the respective reels.

In order to prevent rotation of supply reel 3 in the rewind or reverse direction, as shown by the arrow in FIG. 1, tape cassette 1 includes a reel lock mechanism 12 disposed at an intermediate position between supply reel 3 and take-up reel 4 inside cassette housing 2. In particular, reel lock mechanism 12 includes a support pin 13 projecting upright from the bottom of lower half 2A of cassette housing 2, and an eccentric roller 14 rotatably mounted about support pin 13. A coil spring 15 is also provided for biasing roller 14 in the clockwise directon about support pin 13, as viewed in FIG. 1, such that the outer periphery of roller 14A is in contact with both outer peripheries 3a and 3b of lower and upper flange sections 3A and 3B, respectively, of supply reel 3.

When supply reel is rotated in the direction of the arrow in FIG. 1, that is, in the rewind direction, roller 14 is urged in the clockwise direction and is wedged against the outer peripheries 3a and 3b of flange sections 3A and 3B, respectively, to prevent rotation of supply reel 3. On the other hand, when supply reel 3 is rotated in the normal forward or playback direction, that is, in a direction opposite to the arrow shown in FIG. 1, roller 14 is urged in the counter-clockwise direction, while still in contact with outer peripheries 3a and 3b of flange sections 3A and 3B, respectively. In this manner, reel lock mechanism 12 prevents movement of tape T in the rewind direction, while permitting free movement of the tape in the playback direction. However, during the playback operation, the outer periphery 14A of roller 14 continuously rolls over outer peripheries 3a and 3b of flange sections 3A and 3B, and therefore repeatedly hits or bumps against teeth 11 formed along outer periphery 3a of lower flange section 3A. As a result, undesirable mechanical noise, such as a clicking sound, is generated during the playback operation.

Figure 2:
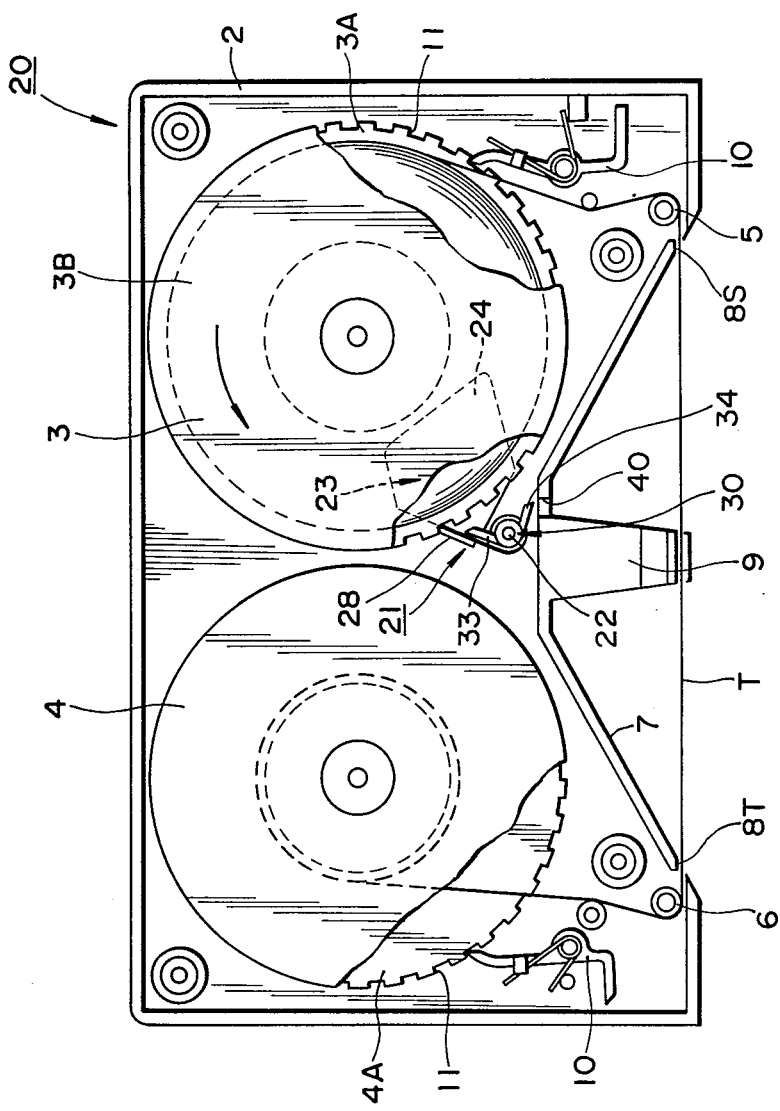
FIG. 2 is a schematic plan view, partially broken away, of a tape cassette according to one embodiment of this invention with the upper half thereof removed.
Figure 3:
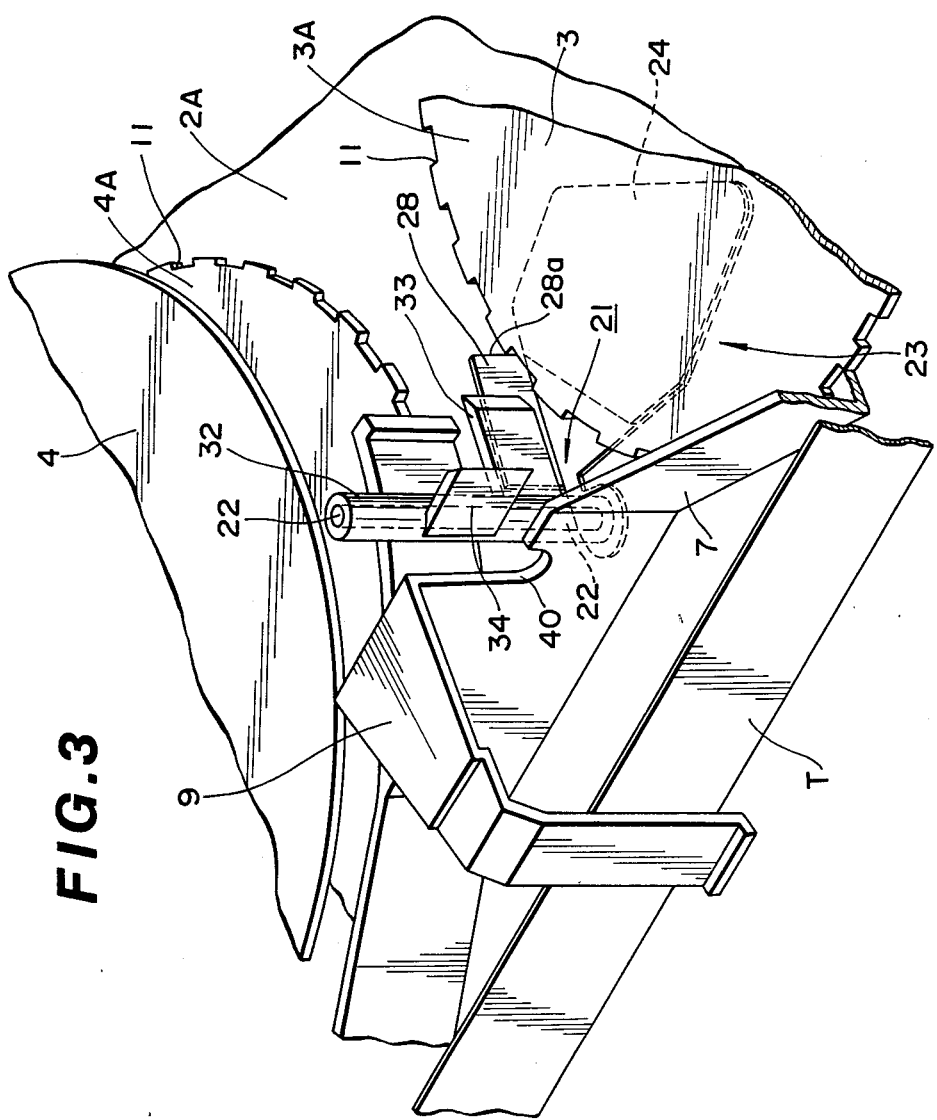
FIG. 3 is an enlarged perspective view of the reel lock mechanism of the tape cassette of FIG. 2.
Figure 4A:
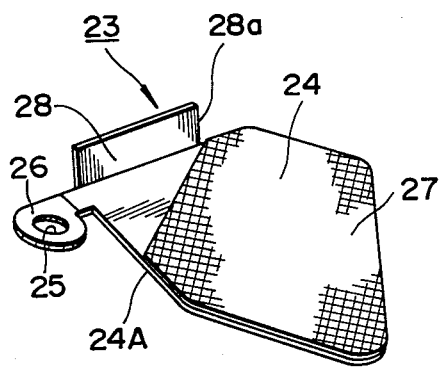
FIG. 4A is an enlarged perspective view of a control member of the reel lock mechanism of FIG. 3.
Figure 4B:
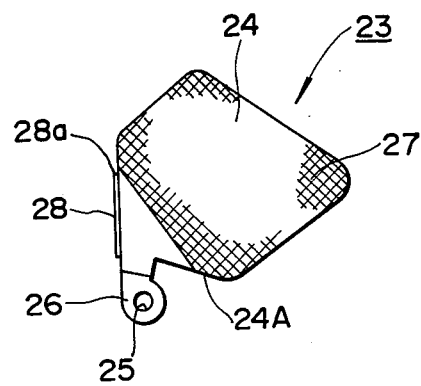
FIG. 4B is a plan view of the control member of FIG. 4A.
Figure 4C:
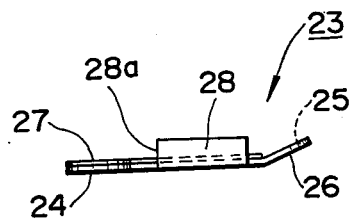
FIG. 4C is an elevational view of the control member of FIG. 4A.

Referring now to FIGS. 2 and 3, a tape cassette 20 according to one embodiment of this invention will now be described, in which elements corresponding to those described above with reference to the prior art tape cassette of FIG. 1 are identified by the same reference numerals and a detailed description thereof will be omitted herein for the sake of brevity. As shown therein, a reel lock mechanism 21 is provided in place of reel lock mechanism 12 of FIG. 1 for preventing rotation of supply reel 3 in the reverse or rewind direction, shown by the arrow in FIG. 2, while permitting rotation of supply reel 3 in the normal forward or playback direction. Reel lock mechanism 21 is disposed at an intermediate position between supply reel 3 and take-up reel 4 in cassette housing 2 and includes a support pin 22 projecting upright from the bottom of lower half 2A of cassette housing 2, a rotatable control member 23 for preventing movement of supply reel 3 in the direction of the arrow of FIG. 2, while permitting movement thereof in the reverse direction, and a reel lock release device 30 for releasing control member 23 from supply reel 3 so as to permit rotation of the latter in the reverse or rewind direction.

Figure 5:
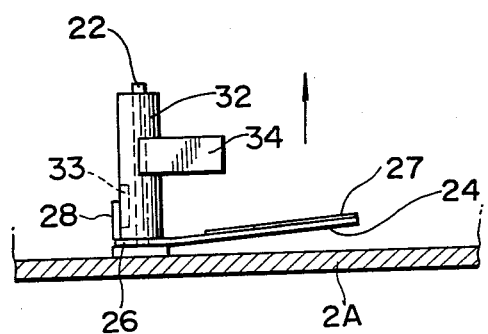
FIG. 5 is an enlarged elevational view showing the relation between the control member of FIG. 4A in the reel lock mechanism of FIG. 3.
Figure 7:
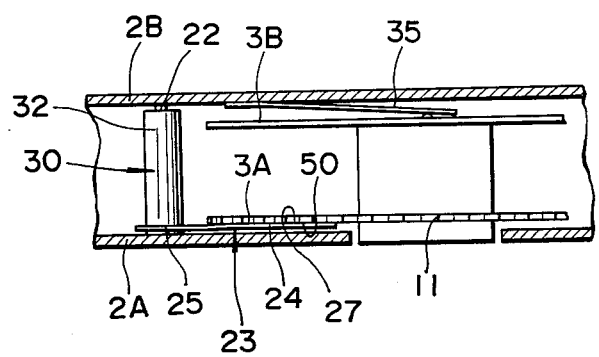
FIG. 7 is an enlarged cross-sectional view of a portion of the tape cassette of FIG. 2, illustrating the relation between the control member of FIG. 4A and the supply reel.
Figure 8:
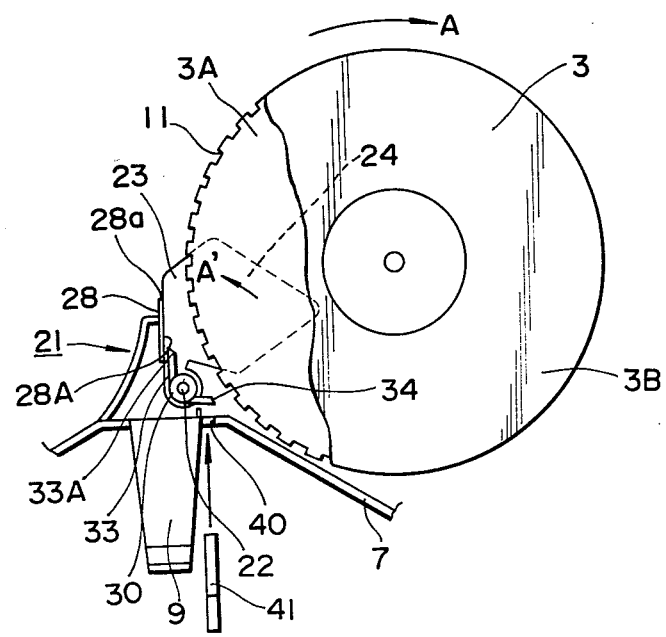
FIG. 8 is an enlarged plan view of the reel lock mechanism of FIG. 3 during forward or playback rotation of the supply reel.

As shown more particularly in FIGS. 3, 4A-4C, 5 and 7, control member 23 includes a reel receiving plate 24 having a substantially parallelogram configuration and which, as will be discussed in greater detail hereinafter, is in an elastically abutting relation with the underside 50 of lower flange section 3A of supply reel 3. In this regard, the upper surface 27 of reel receiving member 24 is preferably knurled or has a frictional contact member applied thereto to provide increased frictional resistance of contact when surface 27 contacts the underside 50 of lower flange section 3A of supply reel 3. A ring portion 26 is secured to one side 24A of reel receiving member 24 and is bent at a predetermined angle thereto. Ring portion 26 includes an aperture 25 for rotatably supporting control member 23 on support pin 22, as shown in FIG. 5. In this manner, because of the predetermined angle of ring portion 26 with respect to reel receiving member 24, the latter extends upwardly at an angle when control member 23 is assembled on support pin 22. Control member 23 also includes a reel lock member 28 which extends upright from an edge of reel receiving member 24 adjacent ring portion 26 for preventing movement of supply reel 3 in the reverse or rewind direction. In particular, a forward end 28a of reel lock member 28 is adapted to be disengaged and engaged with teeth 11 of lower flange section 3A of supply reel 3, as shown in FIGS. 8 and 9, respectively, for permitting movement of supply reel 3 in the forward or playback direction and preventing movement of supply reel 3 in the rewind direction, respectively.

Figure 6A:
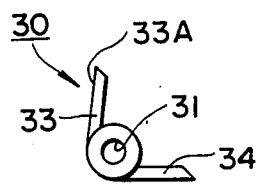
FIG. 6A is an enlarged plan view of a release device of the reel lock mechanism of FIG. 3.
Figure 6B:
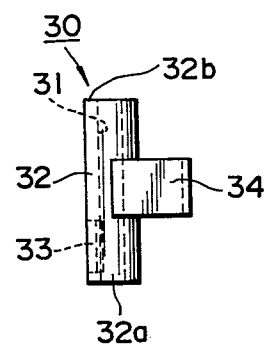
FIG. 6B is an elevational view of the release device of FIG. 6A.

Reel lock release device 30, as shown in FIGS. 6A and 6B, includes a cylindrical portion 32 having a longitudinal bore 31 into which support pin 22 is adapted to be inserted. In this manner, when tape cassette 20 is assembled, cylindrical portion 32 sits over support pin 22 and on ring portion 26 to prevent vertical movement of the latter on support pin 22. A first tongue or projection 33 extends tangentially from the outer periphery of cylindrical portion 32 at the lower end 32a thereof for releasing reel lock member 28 from teeth 11 of lower flange section 3A, whereby to provide for rotation of supply reel 3 in the rewind direction. In particular, as shown in FIG. 8, when cylindrical portion 32, and thereby tongue 33, is rotated in the direction of arrow A' of FIG. 8, one side 33A of tongue 33 is brought into engagement with a side surface 28A of reel lock member 28 and thereby biases reel lock member 28 out of engagement with teeth 11 of lower flange section 3A to allow rotation of supply reel 3 in the rewind direction.

Accordingly, a second tongue or projection 34 extends tangentially from the outer periphery of cylindrical portion 32 at an upper or middle end thereof and at right angles to first tongue 33. In this manner, as will be described in greater detail hereinafter, when tongue 34 is biased in the direction of arrow A' in FIG. 8, tongue 33 and cylindrical portion 32 are likewise biased in the same direction. It is to be appreciated that tongues 33 and 34 and cylindrical portion 32 can be formed as an integral molded piece, for example, of a synthetic resin.

In assembling tape cassette 20 according to this invention, control member 23 is positioned over support pin 22 such that surface 27 thereof is positioned below the underside 50 (FIG. 7) of lower flange section 3A. Reel lock release device 30 is then mounted on support pin 22, as shown in FIG. 5. It is to be appreciated, at this time, that reel receiving member 24 is inclined upwardly with respect to ring portion 26. When the upper half 2B of cassette housing 2 is assembled with lower half 2A, supply reel 3 is urged toward lower half 2A of cassette housing 2 by a reel biasing leaf spring 35 provided on the underside of upper half 2B of cassette housing 2, as shown in FIG. 7. As a result, reel receiving member 24 is biased toward the bottom of lower half 2A of cassette housing 2 by leaf spring 35, whereby surface 27 of reel receiving member 24 is maintained in an elastically biased contact state with the underside 50 of lower flange section 3A. It is to be appreciated that ring portion 26 of control member 23 thereby tends to move upwardly along support pin 22, raising reel lock release device 30. This latter movement, however, is restricted by the engagement of the upper end 32b of cylindrical portion 32 of reel lock lease device 30 with the underside of upper half 2B of cassette housing 2.

In operation, when supply reel 3 is rotated in the normal forward or playback direction, shown by arrow A of FIG. 8, to supply tape, reel receiving member 24 which is in contact with the underside 50 of lower flange section 3A of supply reel 3 is rotated in the direction of arrow A' of FIG. 8 by the frictional force of contact. As a result, reel lock member 28 of control member 23 is rotated out of engagement with teeth 11 at the periphery 3a of lower flange section 3A, and supply reel 3 can therefore be freely rotated in the normal forward or playback direction. It is to be appreciated that, during the playback operation, no undesirable mechanical noise, such as a clicking sound or the like, is produced.

When supply reel 3 is rotated in the direction of arrow B in FIG. 9, the frictional contact of reel receiving member 24 with the underside 50 of lower flange section 3A causes the former to rotate in the direction of arrow B' in FIG. 9. As a result, the end 28a of reel lock member 28 is rotated into engagement with teeth 11 of lower flange section 3A to lock supply reel 3 against further rotation in the direction of arrow B, that is, in the reverse or rewind direction.

It is to be appreciated that after the tape cassette is returned to the lessor, the latter must rewind the tape for operation by a subsequent user. Accordingly, in front wall 7 of cassette housing 2, a tool insertion aperture 40 is provided, as shown in FIGS. 8-10, for biasing tongue 34 in the direction of arrow A' of FIG. 8 to thereby rotate reel lock member 28 out of engagement with teeth 11 of lower flange section 3A. In this regard, a reel lock release tool 41, as shown in FIGS. 11A and 11B, of a substantially L-shaped configuration is provided, and includes a piercing portion 42 which is adapted to be inserted into aperture 40 such that the end 42a thereof engages with tongue 34 for biasing the latter in the direction of arrow A' of FIG. 8. A recess 43 is provided at the attached end of piercing portion 42 for locking tool 41 into aperture 40. In this manner, since reel lock member 28 is biased out of engagement with teeth 11 of lower flange section 3A, supply reel 3 can be rotated in the reverse or rewind direction to rewind the tape for subsequent use. It is to be apppreciated that, at the time that tape cassette 20 is leased, aperture 40 is concealed by the tape. In addition, because aperture 40 is located in front wall 7 of cassette housing 2, which is enclosed by a front cover (not shown), it becomes difficult for the user to recognize the aperture.

Having described a specific preferred embodiment of this invention with reference to the accompanying drawings, it is to be understood that the present invention is not limited to that precise embodiment and that various changes and modifications may be effected therein by one skilled in the art without departing from the scope or spirit of the invention as defined in the appended claims herein.

What is claimed is:

1. A tape cassette comprising:
   a rotatable supply reel having flange means;
   a rotatable take-up reel; and
   said supply and take-up reels being mounted for rotation in either one or two opposed directions;
   a tape wound on said supply and take-up reels and extending between said reels;
   lock means for preventing rotation of said supply reel in a first of said directions to rewind said tape on said supply reel;
   means for moving said lock means including pivot means and plate means secured to said lock means and pivotally mounted on said pivot means, said plate means being in frictional engagement with said supply reel for pivotally moving said lock means into locking contact with said flange means in response to rotation of said supply reel in said first direction to prevent rotation of said supply reel in said first direction, and for pivotally moving said lock means out of contact with said flange means to permit rotation of said supply reel in a second direction opposite to said first direction for unwinding said tape from said supply reel in response to rotation of said supply reel in said second direction.

2. A tape cassette according to claim 1; in which said plate means includes a frictional contact surface in elastically biased engagement with said supply reel.

3. A tape cassette according to claim 1, further comprising release means for moving said lock means out of contact with said flange means, independently of the direction of rotation of said supply reel, to selectively permit rotation of said supply reel in said first direction.

4. A tape cassette according to claim 1; in which said flange means includes at least one recess and said lock means includes a reel lock member adapted to engage in said at least one recess for preventing rotation of said supply reel in said first direction to take up said tape.

5. A tape cassette according to claim 4; further including housing means rotatably supporting said supply reel and said take-up reel; and in which said release means includes pivot means pivotally mounted in said housing means, and first projection means secured to said pivot means for pivotally moving said reel lock member out of engagement with said at least one recess, independent of the direction of rotation of said supply reel, to permit rotation of said supply reel in said first direction to take up said tape.

6. A tape cassette according to claim 5; in which said release means includes second projection means secured to said pivot means; and said housing means includes an aperture through which tool means can be inserted into engagement with said second projection means to pivot said second projection means, said pivot means and said first projection means so as to pivotally move said reel lock member out of engagement with said at least one recess, independent of rotation of said supply reel, to permit rotation of said supply reel in said first direction to take up said tape.

* * * * *